Figure 1:
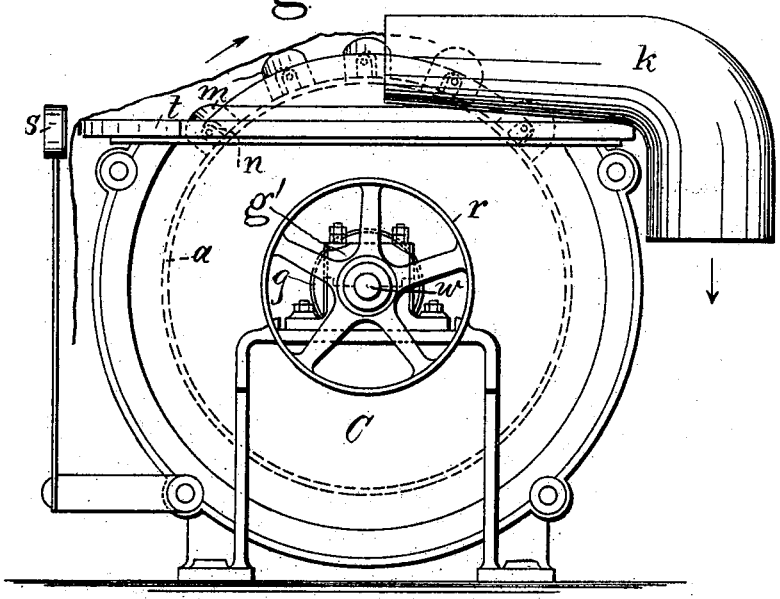

No. 618,988. Patented Feb. 7, 1899.
P. LEYENDECKER.
MACHINE FOR TREATING SKINS OR HIDES.
(Application filed Dec. 24, 1897.)

(No Model.) 2 Sheets—Sheet 1.

Witnesses.
P. S. Ober
B. Sommers

Inventor.
Paul Leyendecker
by
Atty.

THE NORRIS PETERS CO., PHOTO-LITHO., WASHINGTON, D. C.

No. 618,988. Patented Feb. 7, 1899.
P. LEYENDECKER.
MACHINE FOR TREATING SKINS OR HIDES.
(Application filed Dec. 24, 1897.)
(No Model.) 2 Sheets—Sheet 2.
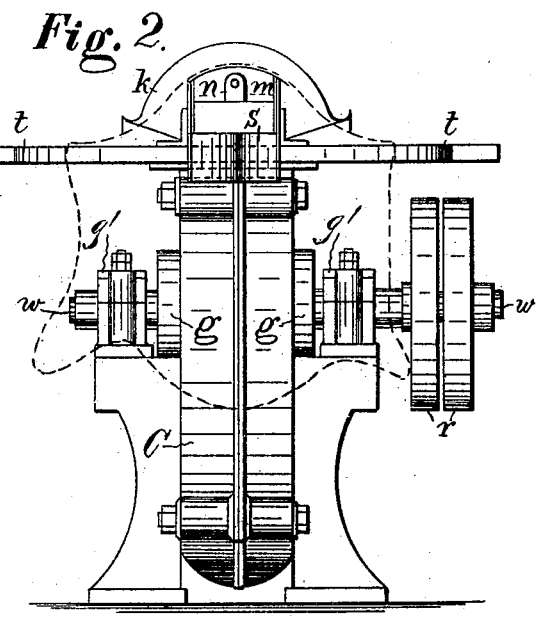
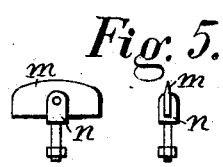
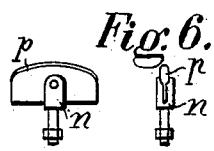
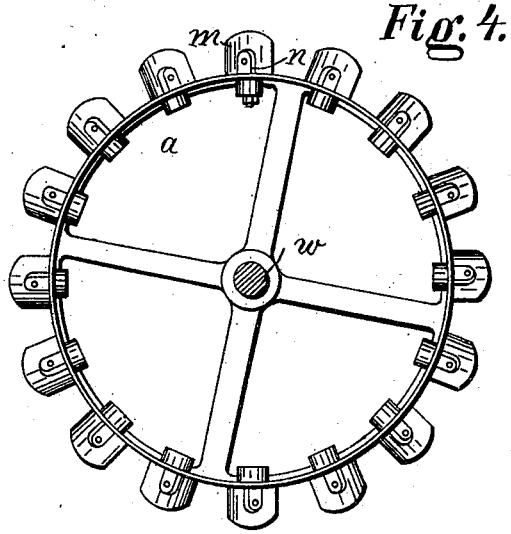
Witnesses
Inventor
Paul Leyendecker,
by
Atty.
THE NORRIS PETERS CO., PHOTO-LITHO., WASHINGTON, D. C.

UNITED STATES PATENT OFFICE.

PAUL LEYENDECKER, OF CHARLOTTENBURG, GERMANY.

MACHINE FOR TREATING SKINS OR HIDES.

SPECIFICATION forming part of Letters Patent No. 618,988, dated February 7, 1899.

Application filed December 24, 1897. Serial No. 663,389. (No model.)

*To all whom it may concern:*

Be it known that I, PAUL LEYENDECKER, a subject of the German Emperor, residing at Charlottenburg, near Berlin, Germany, have invented an Improved Machine for Treating Skins or Hides; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a machine for softening and smoothing skins and hides and for rendering them supple, and has for its object to provide a machine which shall replace the tedious handwork still to a large extent in vogue. The said handwork consists in working the skins, which in the preliminary operations have had a certain amount of stiffness imparted to them with sharp convex or curved knives, provided with handles, upon the flesh side for the purpose of making them supple, and in working them upon the grain side with similarly-shaped glass or steel plates having rounded polished edges.

Machines with long rollers the knives of which have curved or convex cutting edges and against which, the skins or hides are pressed are unsuitable for energetically working skins or hides and cannot be looked upon as an efficient substitute for the above-mentioned handwork.

Now the object of this invention is to obviate this disadvantage; and to this end I provide a machine the main feature of which consists of a wheel or drum designed to be rotated and which carries the knives and plates for working the flesh side and the grain side, respectively, of the skins, the said knives being alternately inclined in opposite directions with respect to the wheel-axis and having convex cutting or working edges for the purpose of enabling the skin to be drawn to and fro laterally in the arc of a circle over the knives or smoothing-plates of the quickly-moving wheel or drum, the skin being held by means of a suitable device arranged at a distance from the parts being worked and against which the attendant presses with his body.

In the accompanying drawings, Figure 1 is a left end elevation of a machine constructed according to the invention. Fig. 2 is a left end elevation, and Fig. 3 is a plan view, thereof; and Figs. 4, 5, and 6 are views of details.

Figure 3:
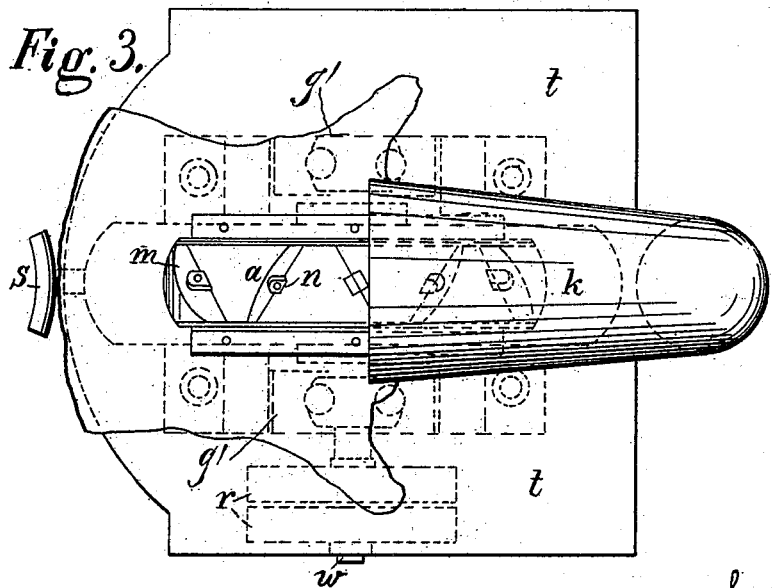

The machine is provided with a wheel or drum $a$, (see Fig. 4,) designed to be rotated at a high speed by means of a pulley $r$ and shaft $w$ and carrying sharp knives $m$ (see Fig. 5) or smoothing-plates $p$ (see Fig. 6) for working, respectively, the flesh side and the grain side of the skin, the said knives and plates being alternately inclined in opposite directions with respect to the drum-shaft $w$, as shown in Fig. 3. The object of thus inclining the knives alternately in opposite directions is to prevent the skin or hide being pulled toward one side.

The working edges both of the sharp knives $m$ and of the smoothing-plates $p$ are curved in such a manner that it is possible to pull the skin to and fro over the said knives and plates in the arc of a circle, the skin or hide being held against the edge of the work-table at a point removed from the parts of the skin being worked by means of a clip $s$, against which the attendant presses with his body. The said clip $s$ is carried by a spring-rod, so that when pressure is removed therefrom the skin or hide is at once released.

The leather-dust is caught in a known manner by a hood $k$ and conveyed away by means of an exhauster. This hood $k$ extends from the rear of the machine practically to the vertical plane through the drum-shaft $w$, so that there are always about three tools above the table $t$ free to grip the skin.

In machines of the class referred to, in which the knives are mounted on a revoluble drum, a support or bed for the hide or skin is used, the knives being arranged with their edges parallel with the axis of rotation and make a draw cut, the hide or skin being secured to the bed with its free end in the direction of rotation of the knives. In the arrangement described the support for the skin is dispensed with, the operator himself moving the skin to and fro across the knives, preferably in an arc of a circle. It is obvious that if the knives were secured to the drum with their cutting edges parallel with the axis of rotation of said drum the draft upon the skin would be such as to require considerable strength to hold the same to the knives. On the other hand, if all the knives were set at the same angle to the axis of rotation there would be a similar lateral draft. This is avoided by setting the knives as described. This draft upon the skin by the knives or polishing-plates is materially lessened by providing an arcuate—i. e., convex—cutting edge, and this also facilitates the drawing of the skin to and fro across the knives.

The knives m and polishing-plates n have screw-threaded shanks, by means of which and suitable nuts they are secured to the drum a, which latter revolves in a casing C, acting as a shield to protect the workman, the said casing being open at its upper end and having secured thereto the hood k, above referred to. The casing C is formed in two parts and has formed therewith the feet to support the same and the standards for the bearings g' for the shaft w, which passes loosely through bearings g on the casing C and has secured thereto the drum a, said shaft carrying a loose and fast pulley, both indicated by the symbol r. The direction of rotation of the drum a and the flow of the shavings or leather-dust are indicated by arrows in Fig. 1.

The machine is started by passing the belt upon the fast pulley. The workman seizes the skin or hide at the sides, brings it between the table t and the spring-clip s, and presses with his body against the latter, thereby holding the skin fast at this point. He then draws the skin to and fro in a lateral direction over the rapidly-moving knives or plates, so that the latter work in a scoop-like manner to the right and left and do not tend to pull the skin to one side or the other.

By means of the spring-clip s, which follows the movements of the body of the workman, the skin can be easily released, readjusted, and again gripped.

Having now particularly described my invention, what I claim, and desire to secure by Letters Patent, is—

1. In a machine for dressing skins, a revoluble drum and dressing implements secured thereto with their operative edges alternately inclined in opposite directions relatively to the axis of rotation of the drum, and means for securing the skin so that it may be held to said implements by hand, for the purpose set forth.

2. In a machine for dressing skins, a revoluble drum and dressing implements having convex operative edges secured thereto with their said edges inclined alternately in opposite directions relatively to the axis of rotation of the drum, and means for securing the skin so that it may be held to said implements by hand, for the purposes set forth.

3. A machine for dressing skins comprising a revoluble drum, dressing implements secured thereto with their operative edges alternately inclined in opposite directions, a spring-supported clamping-plate to be operated by the pressure of the body of the operator for clamping the skin so that it may be held to the implements by hand, and a protective casing partly inclosing said drum, for the purposes set forth.

In testimony that I claim the foregoing as my invention I have signed my name in presence of two subscribing witnesses.

PAUL LEYENDECKER.

Witnesses:
   MAX. C. STAEHLER,
   CHARLES H. DAY.